(12) United States Patent
Miyamoto

(10) Patent No.: US 9,967,312 B2
(45) Date of Patent: May 8, 2018

(54) REMOTE SUPPORT SYSTEM AND METHOD FOR CONTROLLING THE REMOTE SUPPORT SYSTEM

(71) Applicant: KYOCERA Document Solutions Inc., Osaka (JP)

(72) Inventor: Takanori Miyamoto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 343 days.

(21) Appl. No.: 14/828,442

(22) Filed: Aug. 17, 2015

(65) Prior Publication Data

US 2016/0054866 A1 Feb. 25, 2016

(30) Foreign Application Priority Data

Aug. 20, 2014 (JP) ................................. 2014-167477

(51) Int. Cl.
*G06F 15/177* (2006.01)
*H04L 29/08* (2006.01)
*H04L 12/24* (2006.01)
*G06F 3/12* (2006.01)
*H04L 12/58* (2006.01)

(52) U.S. Cl.
CPC .............. *H04L 67/02* (2013.01); *H04L 41/06* (2013.01); *H04L 67/125* (2013.01); *G06F 3/12* (2013.01); *H04L 51/04* (2013.01)

(58) Field of Classification Search
CPC .. G06F 19/322; G06F 19/3487; G06F 19/325; G06F 19/3406; G06F 19/3418; G06F 19/3456; G06F 19/363; G06F 17/2785; G06F 19/324
See application file for complete search history.

(56) References Cited

U.S. PATENT DOCUMENTS

2010/0302586 A1* 12/2010 Takahashi .......... G03G 15/5075
358/1.15
2014/0101261 A1* 4/2014 Wu ...................... G06Q 10/107
709/206

FOREIGN PATENT DOCUMENTS

JP 2004-364205 A 12/2004

* cited by examiner

*Primary Examiner* — Di Xiao
(74) *Attorney, Agent, or Firm* — Stein IP, LLC

(57) ABSTRACT

In a remote support system, an image forming apparatus, a staff terminal, and a management apparatus are connected to one another for communication. The management apparatus accumulates a conversation pattern communicated in a conversation form between the image forming apparatus and the staff terminal, and when the management apparatus receives a guidance request from the image forming apparatus, the management apparatus forces the staff terminal to display a selection screen that displays, as choices, the conversation patterns, and forces a request sending apparatus to display a selected conversation pattern as a guidance.

7 Claims, 9 Drawing Sheets

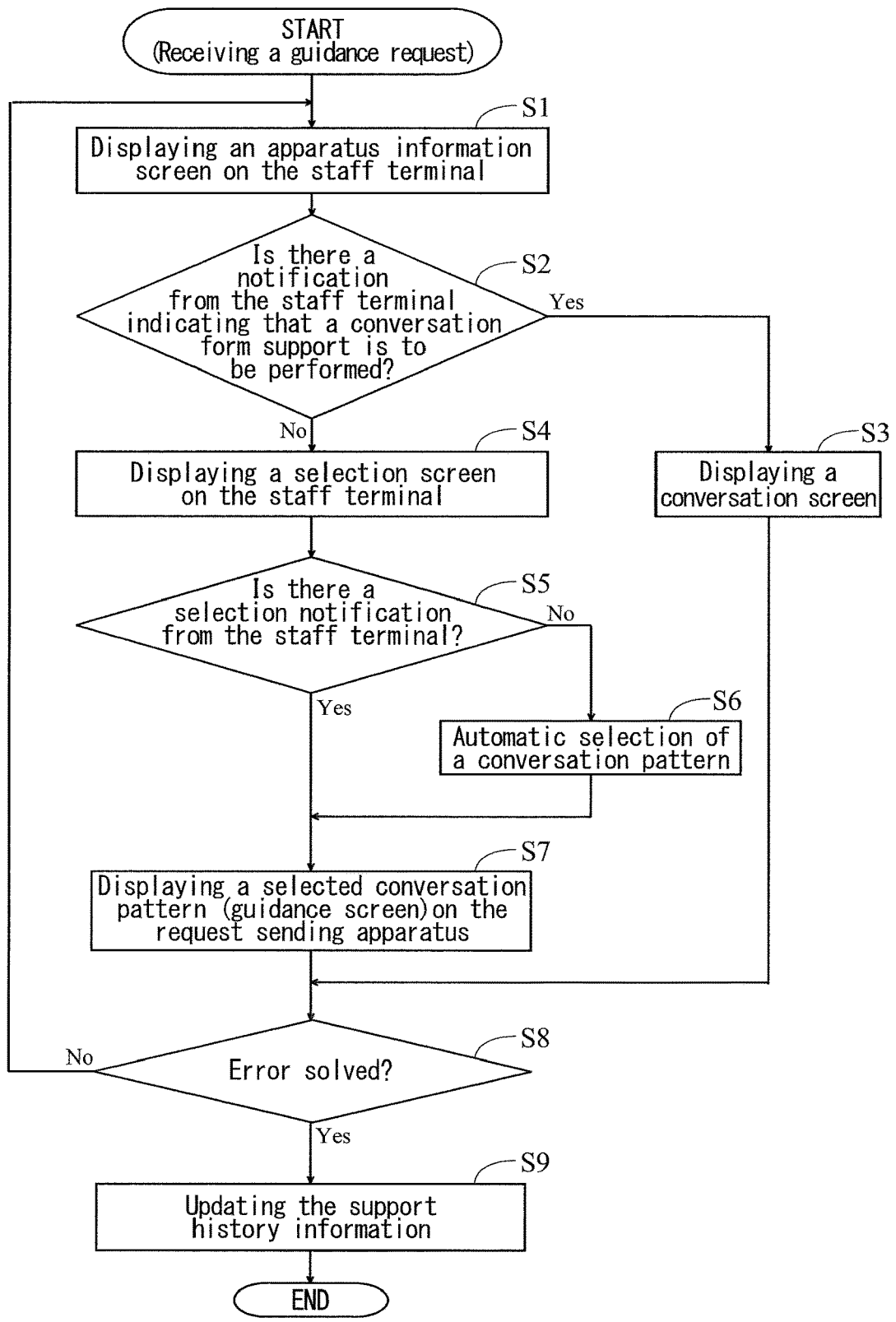

REMOTE SUPPORT SYSTEM AND METHOD FOR CONTROLLING THE REMOTE SUPPORT SYSTEM

INCORPORATION BY REFERENCE

The present application is based on Japanese Patent Application No. 2014-167477 filed on Aug. 20, 2014, the contents of which are hereby incorporated by reference.

BACKGROUND

The present disclosure relates to a remote support system for remotely support use of an image forming apparatus and a method for controlling the remote support system.

An image forming apparatus such as a multi-function machine and the like that have a communication function is connected to other apparatuses for communication via a network. For example, such an image forming apparatus is connected to a support center that supports use of the image forming apparatus. Such an image forming apparatus can enjoy a remote support from the support center via a network.

For example, conventionally, in a case where trouble occurs in an image forming apparatus, by gaining access to a support center via a network or a telephone line, information indicating an apparatus state of the image forming apparatus is transmitted to the support center. Thereafter, on the support center side, the information indicating the apparatus state of the image forming apparatus is provided for service staff. And, referring to the apparatus state of the image forming apparatus, the service staff performs a voice support for a user of the image forming apparatus.

SUMMARY

In a remote support system according to a first aspect of the present disclosure, the management apparatus includes a storage portion, a communication portion, and a control portion. The storage portion stores support history information indicating a history of a support which is performed for the image forming apparatus when an error occurs in the image forming apparatus. The communication portion communicates with the image forming apparatus and the staff terminal, and receives, from the image forming apparatus, a guidance request for requesting a guidance necessary for solution of the error occurring in the image forming apparatus. The control portion performs control of the management apparatus. The storage portion accumulates a conversation pattern, which is communicated in a conversation form between the image forming apparatus and the staff terminal to solve the error occurring in the image forming apparatus, as the history of the support performed for the image forming apparatus. And, when the communication portion receives the guidance request, the control portion forces the staff terminal to display a selection screen that displays, as choices, the accumulated conversation patterns in conversation form supports, which were performed in times past between a request sending apparatus, namely, the image forming apparatus transmitting the guidance request and the staff terminal. When data, which indicate the conversation pattern selected at the staff terminal, are transmitted from the staff terminal and the communication portion receives the data, the control portion instructs the communication portion to transmit guidance data, which are used to display a selected conversation pattern, namely, the conversation pattern selected at the staff terminal as the guidance, to the request sending apparatus, thereby forcing the request sending apparatus to display the selected conversation pattern as the guidance.

A method for controlling a remote support system according to a second aspect of the present disclosure is a method for controlling a remote support system in which an image forming apparatus, a staff terminal used by service staff who supports use of the image forming apparatus, and a management apparatus are connected to one another for communication. The management apparatus accumulates a conversation pattern, which is communicated in a conversation form between the image forming apparatus and the staff terminal to solve an error occurring in the image forming apparatus, as the history of the support performed for the image forming apparatus. And, the method comprises: a step in which when the management apparatus receives a guidance request for requesting a guidance necessary for solution of the error occurring in the image forming apparatus, the staff terminal is forced to display a selection screen that displays, as choices, the conversation patterns in conversation form supports, which were performed in times past between a request sending apparatus, namely, the image forming apparatus transmitting the guidance request and the staff terminal; and a step in which when data, which indicate the conversation pattern selected at the staff terminal, are transmitted from the staff terminal and the management apparatus receives the data, guidance data, which are used to display a selected conversation pattern, namely, the conversation pattern selected at the staff terminal as the guidance, are transmitted from the management apparatus to the request sending apparatus, so that the request sending apparatus is forced to display the selected conversation pattern as the guidance.

BRIEF DESCRIPTION OF THE DRAWINGS

FIG. 13 is a flow chart for describing a control flow when a remote support is performed by means of a remote support system according to an embodiment of the present disclosure.

DETAILED DESCRIPTION

<Overview of Remote Support System>

Figure 1:
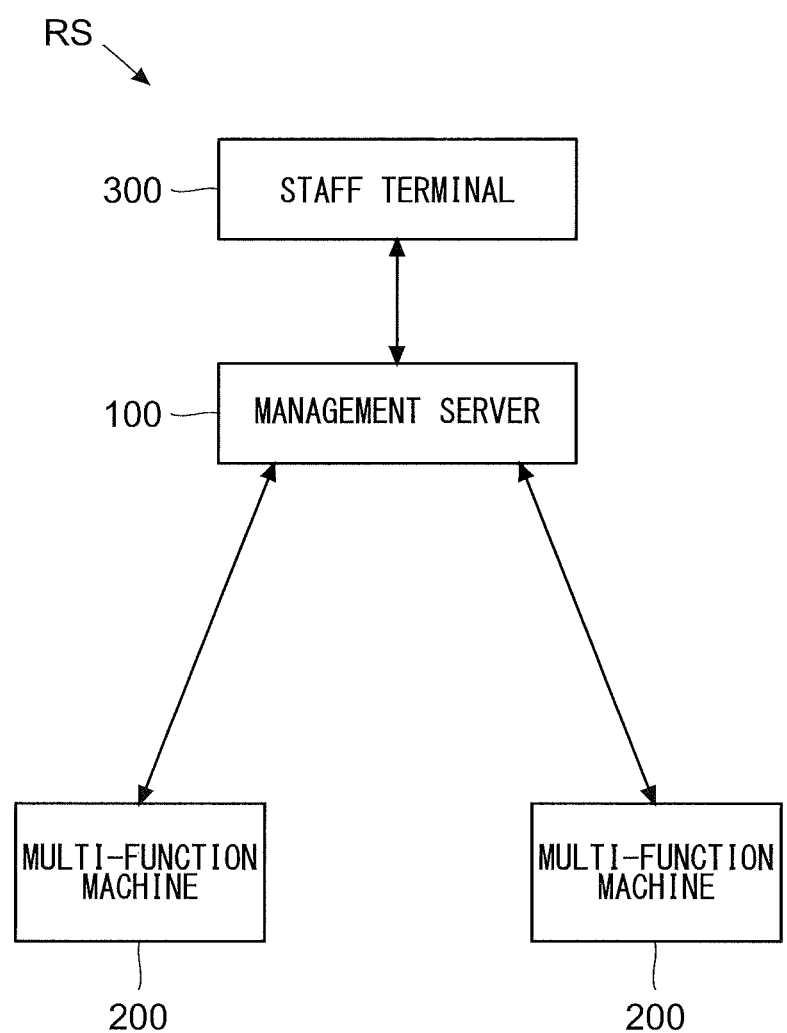
FIG. 1 is a schematic view of a remote support system according to an embodiment of the present disclosure.

As shown in FIG. 1, a remote support system RS according to the present embodiment includes a management server 100, a multi-function machine 200, and a staff terminal 300. The management server 100, the multi-function machine 200, and the staff terminal 300 communicate with one another via a network such as the internet and the like to perform transmission/reception of various kinds of data. The management server 100 is an apparatus on a support center side and corresponds to a "management apparatus." The multi-function machine 200 is an apparatus on a client side and corresponds to an "image forming apparatus." The staff terminal 300 is a terminal used by service staff who supports use of the multi-function machine 200, and is a smart phone, a tablet, a notebook personal computer or the like. In the meantime, the kind of the image forming apparatus included in the remote support system RS is not especially limited, but for example, may be a printer apparatus or a fax apparatus. Besides, also the number of the image forming apparatuses included in the remote support system RS is not especially limited.

The management server 100 is a server that manages various kinds of information relevant to the multi-function machine 200, supports a plurality of (one unit is also possible) the multi-function machines 200 and communicates with the supported multi-function machines 200. And, a user of the multi-function machine 200 can ask the management server 100 (support center) for a guidance for solving an error occurring in the use's own machine. Asking the management server 100 for a guidance is performed by transmitting a guidance request from the multi-function machine 200 to the management server 100.

Upon receiving the guidance request from the multi-function machine 200, along with information relevant to the multi-function machine 200 (hereinafter, there is a case of being called a request sending apparatus 200) which transmits the guidance request, the management server 100 notifies the staff terminal 300 of information indicating that there is a guidance request from the request sending apparatus 200. For example, the management server 100 transmits an apparatus name (specifications) of the request sending apparatus 200, content of the error occurring in the request sending apparatus 200, and a history of a support performed for the request sending apparatus 200 to the staff terminal 300. In this way, the service staff studies a guidance to be provided for the request sensing apparatus 200. And, the service staff performs the work for proving a guidance for the request sending apparatus 200. In the meantime, a method for providing a guidance is described later.

<Structure of Each Apparatus Included in the Remote Support System>

Figure 2:
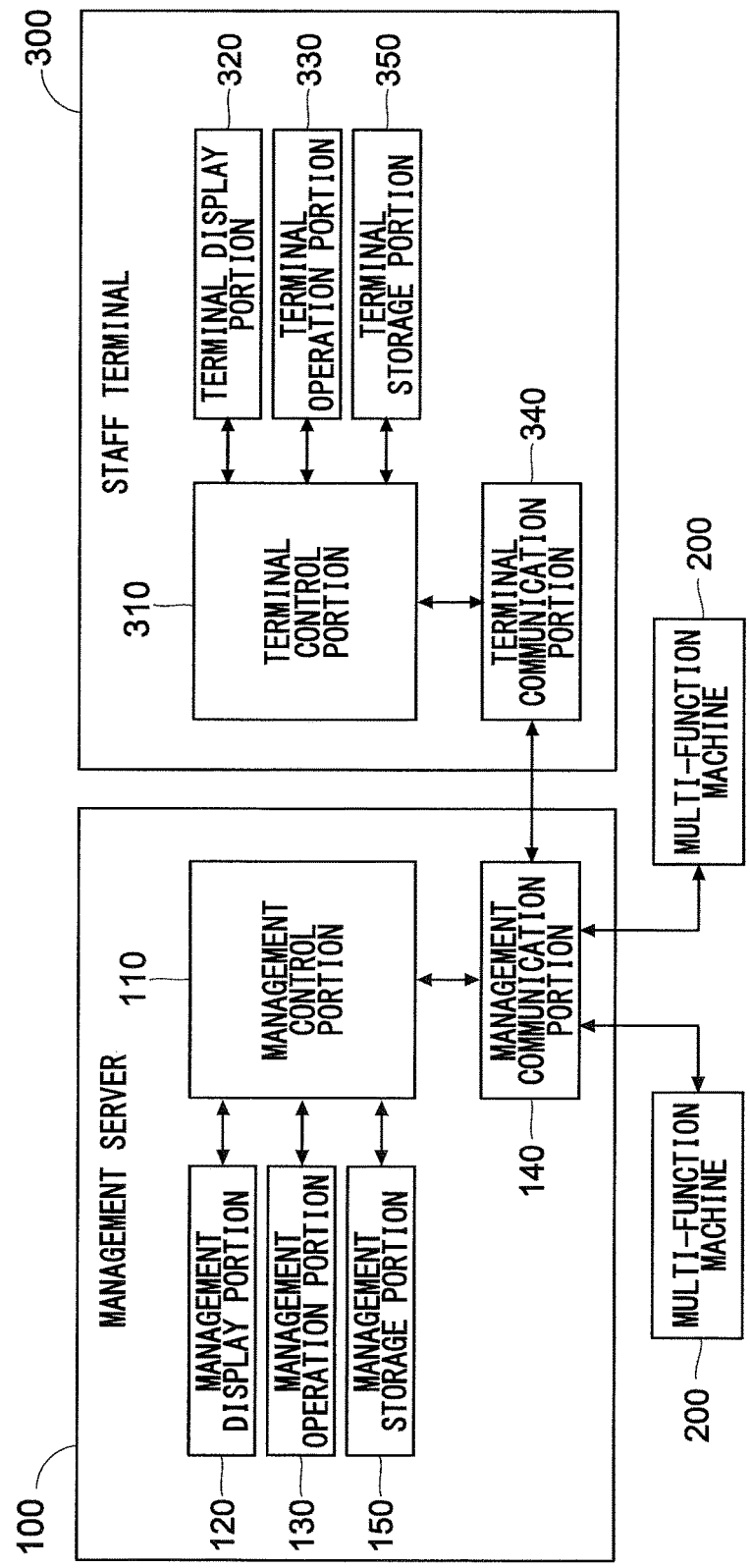
FIG. 2 is a view showing an example of hardware structures of a management server and a staff terminal included in a remote support system according to an embodiment of the present disclosure.

As shown in FIG. 2, the management server 100 includes a management control portion 110, a management display portion 120, a management operation portion 130, a management communication portion 140, and a management storage portion 150. The management control portion 110 corresponds to a "control portion," the management communication portion 140 corresponds to a "communication portion," and the management storage portion 150 corresponds to a "storage portion."

The management control portion 110 performs whole control of the management server 100. The management display portion 120 is, for example, a display apparatus (display such as an LCD and the like) connected to a server main body, and displays various kinds of screens. The management operation portion 130 is an input apparatus (hardware keyboard and the like) connected to the server main body, and accepts various kinds of inputs. For example, the service staff does not use the staff terminal 300, but performs a direct operation on the management server 100 and thereby can also provide a guidance for the request sending apparatus 200.

The management communication portion 140 is controlled by the management control portion 110 to perform various kinds of communications such as internet communication and the like. For example, the management communication portion 140 transmits and receives various kinds of data to and from an external apparatus (the multi-function machine 200 and the staff terminal 300). The management storage portion 150 stores a program and data for controlling the management server 100.

Figure 3:
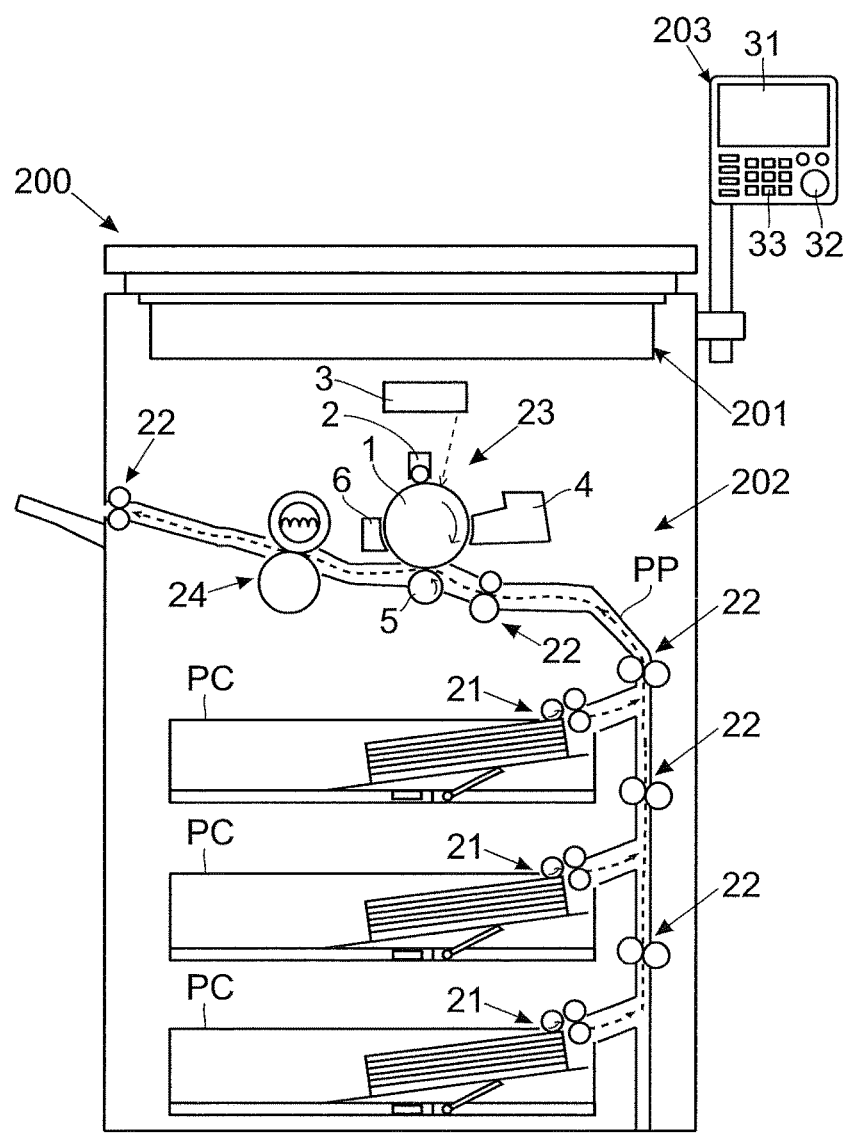
FIG. 3 is a view showing a structural example of a multi-function machine included in a remote support system according to an embodiment of the present disclosure.

As shown in FIG. 3, the multi-function machine 200 includes an image reading portion 201, a printing portion 202, and an operation panel 203.

The image reading portion 201 reads a document to generate image data of the document. For example, the image data of the document obtained by the reading of the image reading portion 201 undergo various kinds of image processes performed by a multi-function machine control portion 210 described later. And, the image data become basic data for facsimile data. Or, the image data become basic data of an image printed by the printing portion 202.

The printing portion 202 is composed of a sheet feeding portion 21, a sheet conveyance portion 22, an image forming portion 23, and a fixing portion 24. The sheet feeding portion 21 supplies a sheet stored in a sheet cassette PC to a sheet conveyance path PP. The sheet conveyance portion 22 conveys the sheet along the sheet conveyance path PP. The image forming portion 23 includes a photosensitive drum 1, a charging device 2, a light exposure device 3, a developing device 4, a transfer roller 5, and a cleaning device 6. And, the image forming portion 23 forms a tonner image based on image data, and transfers the tonner image to the sheet. The fixing portion 24 heats and presses the tonner image transferred to the sheet to fix the mage.

The operation panel 203 includes a display panel 31 having a touch panel. The display 31 displays a software key and a massage for accepting various kinds of settings. Besides, the operation panel 203 is provided with hardware keys such as a start key 32, a ten-key pad 33 and the like.

Figure 4:
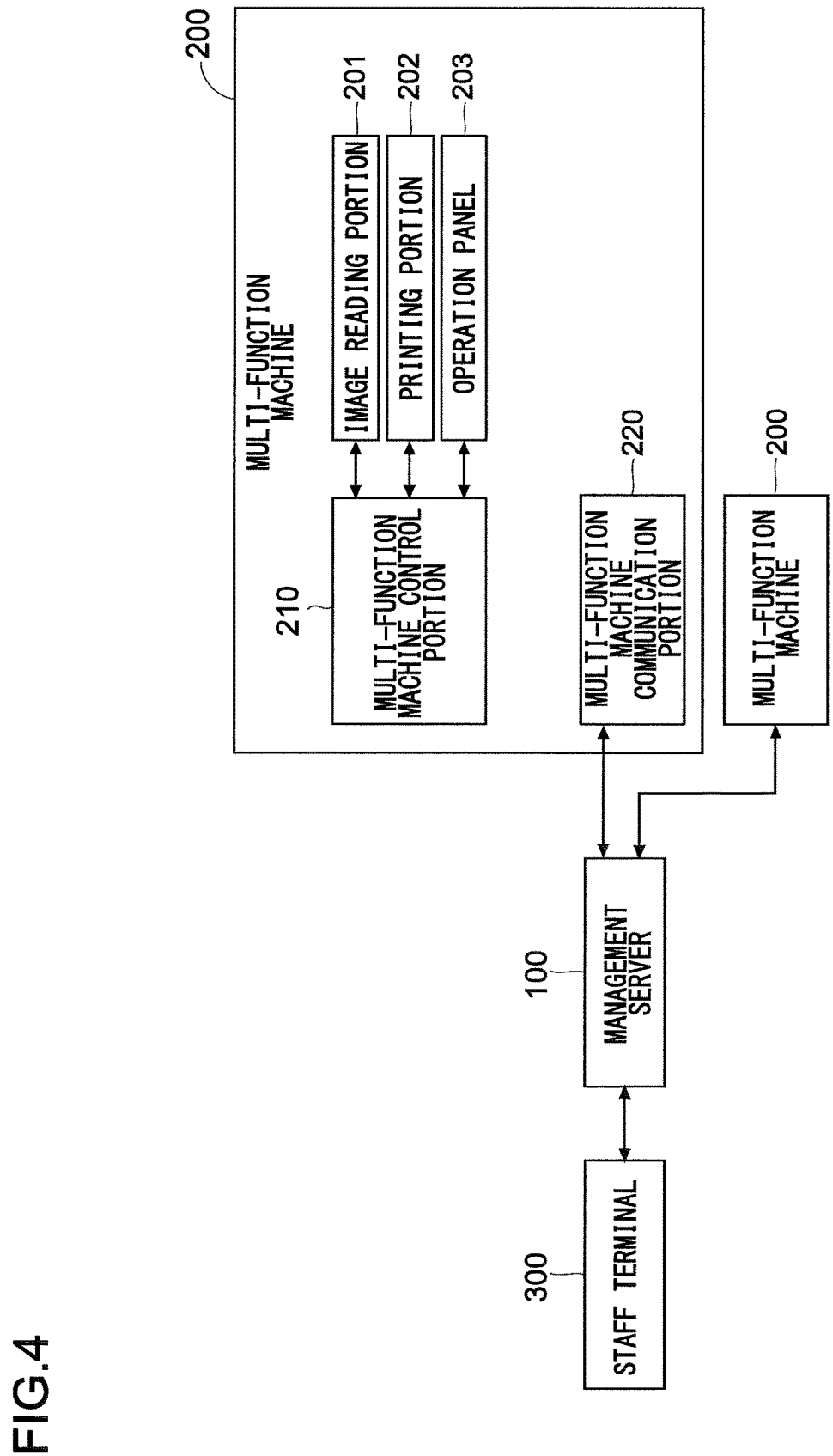
FIG. 4 is a view showing an example of a hardware structure of a multi-function machine included in a remote support system according to an embodiment of the present disclosure.

Besides, as shown in FIG. 4, the multi-function machine 200 includes the multi-function machine control portion 210. The multi-function machine control portion 210 applies various kinds of image processes (enlargement/reduction, concentration change, data format conversion and the like) to image data, and controls a reading operation of the image reading portion 201 and a printing operation of the printing portion 202. A multi-function machine communication portion 220 is connected to the multi-function control portion 210. The multi-function machine communication portion 220 is controlled by the multi-function machine control portion 210 to perform transmission/reception of various kinds of data with an external apparatus (the management server 100 and the staff terminal 300).

Back to FIG. 2, the staff terminal 300 includes a terminal control portion 310, a terminal display portion 320, a terminal operation portion 330, a terminal communication portion 340, and a terminal storage portion 350.

The terminal control portion 310 performs whole control of the staff terminal 300. The terminal display portion 320 displays various kinds of screens. The terminal operation portion 330 accepts various kinds of inputs. For example, the terminal control portion 310 detects an input operation on the terminal operation portion 330, and based on the detection result, forces the terminal display portion 320 to perform a switchover of a display screen.

The terminal communication portion 340 is connected to an external apparatus (the management server 100 and the multi-function machine 200) for communication. And, the terminal communication portion 340 is controlled by the terminal control portion 310 to perform transmission/reception of various kinds of data with the external apparatus. The terminal storage portion 350 stores a program and data for controlling the staff terminal 300.

<Conversation Form Support>

Figure 5:
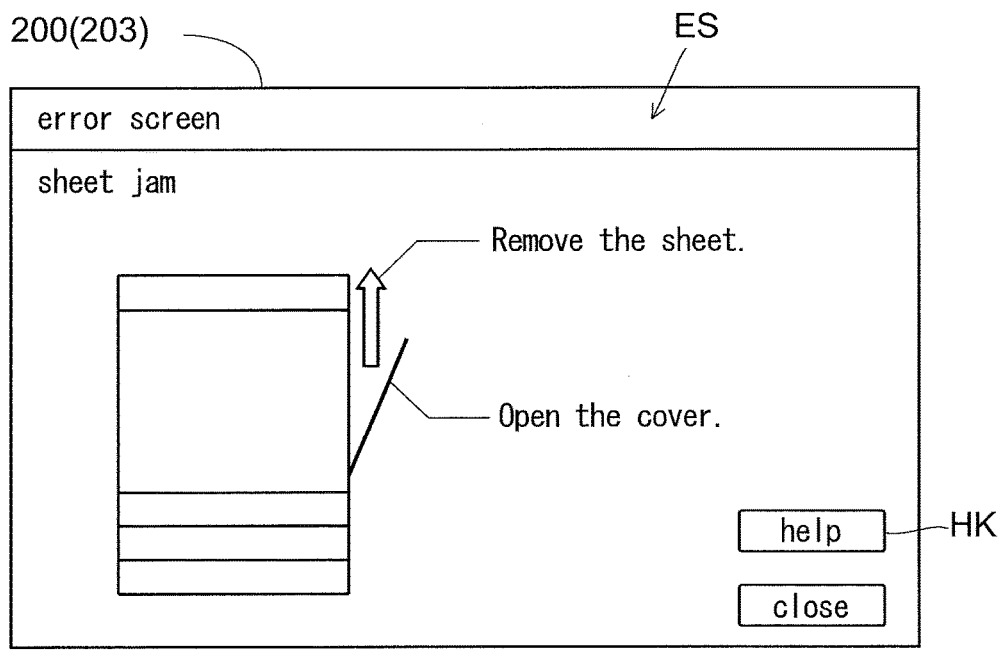
FIG. 5 is a view showing an example of an error screen displayed on a multi-function machine included in a remote support system according to an embodiment of the present disclosure.

If an error occurs in the multi-function machine 200, an error screen ES shown in FIG. 5 is displayed on the operation panel 203 to notify that an error occurs in the multi-function machine 200. For example, the error screen ES displays a work procedure for solving the error occurring in the multi-function machine 200. In this way, the user of the multi-function machine 200 performs the work for solving the error. However, there is a case where some users cannot understand the work procedure displayed on the error screen ES. Or, there is a case where the error is not solved even if the work is performed following the procedure displayed on the error screen ES.

Because of this, the error screen ES disposes a help key HK (software key). The help key HK is a key for accepting a command for requesting a guidance relevant to the error occurring in the multi-function machine 200. In other words, the user of the multi-function machine 200 performs a touch operation on the help key HK and thereby can be provided with a guidance.

Upon detecting a touch operation on the help key HK, the multi-function machine control portion 210 forces the multi-function machine communication portion 220 to transmit a guidance request to the management server 100. The guidance request includes identification information that indicates an apparatus name of the request sending apparatus 200 and error information that indicates content of the error occurring in the request sending apparatus 200. For example, the error information includes information that indicates kinds of errors such as a jam, no sheets left, not toner left, a system error (software error) and the like. In the meantime, in the case of an error, the error information may include information that indicates a position of the jam occurrence.

When the management communication portion 140 receives a guidance request, based on the information included in the guidance request, the management server 100 recognizes the apparatus name of the request sending apparatus 200 and the content of the error occurring in the request sending apparatus 200. And, the management server 100 instructs the management communication portion 140 to notify the staff terminal 300 that there is a guidance request.

At this time, the management communication portion 140 transmits, to the staff terminal 300, the identification information that indicates the apparatus name and type of the request sending apparatus 200, support history information that indicates a history of supports performed in times past for the request sending apparatus 200, and the error information that indicates the content of the error occurring in the request sending apparatus 200. For example, each information is stored into the management storage portion 150 correspondingly to the apparatus name of the multi-function machine 200. Accordingly, by identifying the apparatus name of the request sending apparatus 200, it is possible to obtain the support history information corresponding to the request sending apparatus 200.

Figure 6:
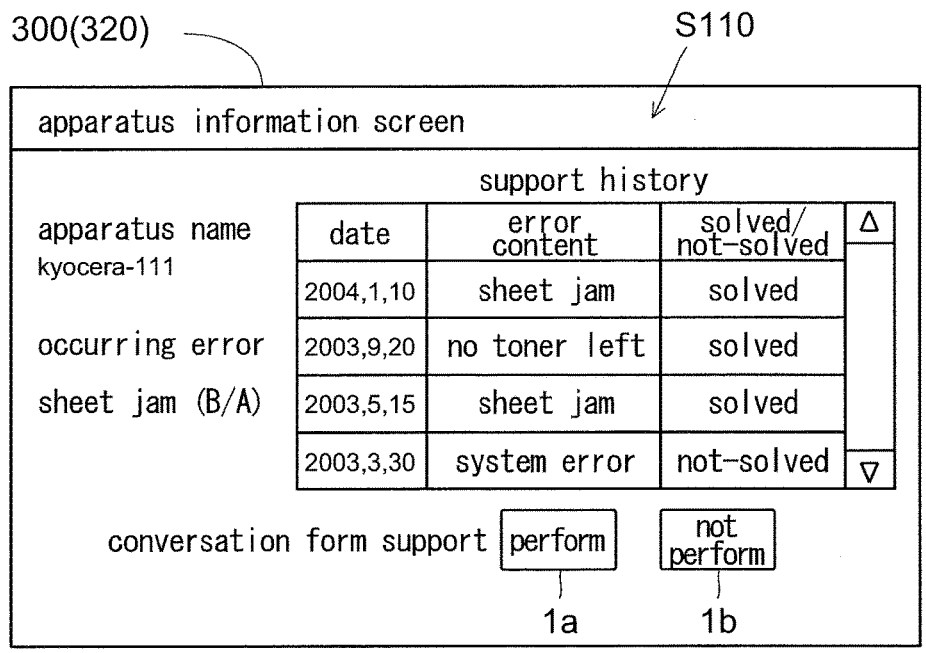
FIG. 6 is a view showing an example of an apparatus information screen displayed on a staff terminal included in a remote support system according to an embodiment of the present disclosure.

Bedsides, when the management communication portion 140 receives a guidance request, the management server 100 instructs the management communication portion 140 to transmit, to the staff terminal 300, a selection request for selecting to or not to perform a conversation form support with the request sending apparatus 200. As shown in FIG. 6, the staff terminal 300 receiving the selection request displays the various kinds of information, relevant to the request sending apparatus 200, on an apparatus information screen S110.

The apparatus information screen S110 indicates the apparatus name of the request sending apparatus 200, the content (error kind) of the error occurring in the request sending apparatus 200, the history of the supports performed in times past for the request sending apparatus 200, and the number of guidance requests sent from the request sending apparatus 200 in times past. For example, the support history indicates a support execution day, content of an error (error kind) occurring during a time of the support execution, and whether a problem is solved by the support execution or not. Besides, as the number of guidance requests, the total number (the number is A in FIG. 6) of guidance requests from the request sending apparatus 200 and the number (the number is B in FIG. 6) of guidance requests caused by errors identical to the current error occurring. In the meantime, information indicating these items is stored in the management storage portion 150. And, based on the content indicated on the apparatus information screen S110, the service staff confirms the various kinds of information relevant to the request sending apparatus 200 and studies a guidance to be provided.

Here, the apparatus information screen S110 disposes icons 1a and 1b for accepting, from the service staff, a selection to or not to perform a conversation form support with the request sending apparatus 200. One icon 1a accepts a command for performing a conversation form support, and the other icon 1b accepts a command for not-performing a conversation form support.

When an operation is performed on the apparatus information screen S110 to select the icon 1a, the staff terminal 300 notifies the management server 100 that a conversation form support is to be performed. The management server 100 receiving the notification forces the request sending apparatus (operation panel 203) 200 to display a conversation screen CS (CS1) shown in FIG. 7. Besides, the staff terminal 300 displays the conversation screen CS (CS2) shown in FIG. 8.

Figure 7:
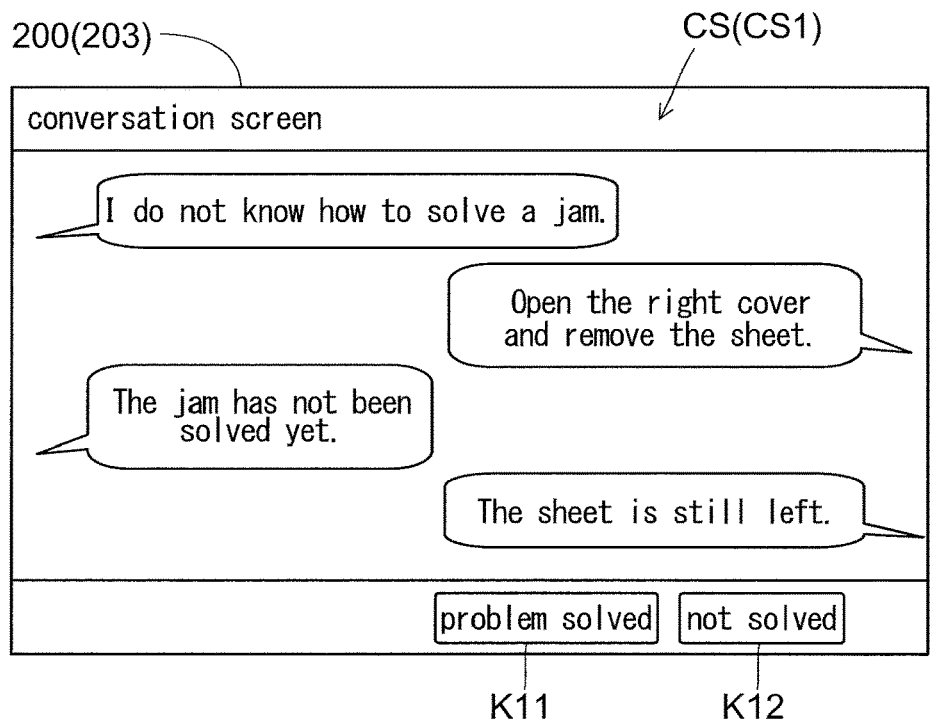
FIG. 7 is a view showing an example of a conversation screen displayed on a multi-function machine included in a remote support system according to an embodiment of the present disclosure.
Figure 8:
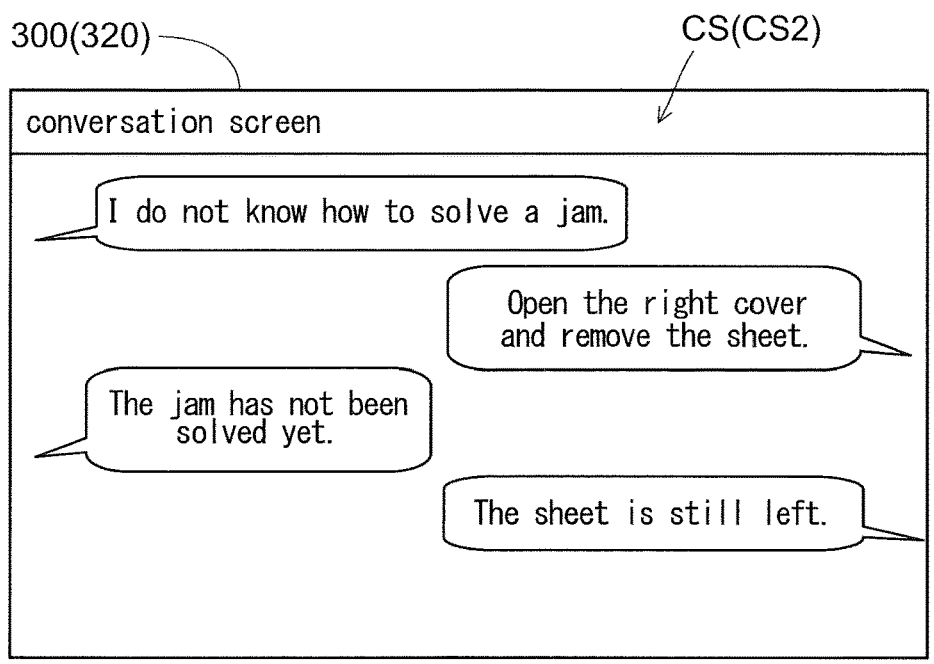
FIG. 8 is a view showing an example of a conversation screen displayed on a staff terminal included in a remote support system according to an embodiment of the present disclosure.

The request sending apparatus 200 and the staff terminal 300 display the conversation screen CS and thereby can perform real-time communication with each other. In other words, the user of the request sending apparatus 200 inputs a question in the conversation screen CS1, and the service staff inputs, in the conversation screen CS2, an answer to the question from the user of the request sending apparatus 200. In this way, conversation form communication becomes possible between the user of the request sending apparatus 200 and the service staff. For example, as shown in FIG. 7 and FIG. 8, a text input by the user of the request sending apparatus 200 is disposed on the left side, and a text input by the service staff is disposed on the right side.

<Non-Conversation Form Support>

There is a case where even if the multi-function machine 200 transmits a guidance request, a conversation form support by the service staff is difficult. For example, when one of the multi-function machines 200 transmits a guidance request, if the service staff is performing a support work for another of the multi-function machines 200, the service staff cannot perform a conversation form support for the one of the multi-function machines 200. Therefore, as shown in FIG. 6, the apparatus information screen S110 displayed on the staff terminal 300 disposes the icon 1b for accepting a command for not-performing a conversation form support from the service staff.

And, when an operation is performed on the apparatus information screen S110 to select the icon 1b, the staff terminal 300 notifies the management server 100 that a conversation form support is not to be performed. The management server 100 receiving the notification forces the staff terminal 300 to display a selection screen S120 shown in FIG. 9.

The selection screen S120 disposes a list 2a that indicates conversation patterns in conversation form supports, which were performed in times past between the request ending apparatus 200 and the staff terminal 300, as choices. For example, an indication box of every conversation pattern displays a partial excerpt from the corresponding conversation pattern. Besides, various kinds of information relevant to a support such as a support execution date and the like is displayed for every conversation pattern. In the meantime, the selection screen S120 disposes therein a cancel icon 2b, and by performing an operation on the cancel icon 2b, it is possible to return to the apparatus information screen S110.

To display the selection screen S120, the support history information stored in the management storage portion 150 is classified for every one of a plurality of the multi-function machines 200 likely to be supported. Besides, the support history information corresponding to every one of the multi-function machines 200 includes data that indicate an execution date of a support for the corresponding multi-function machine 200, content of an error (error kind) occurring during a time of the support execution and the like. And, in a case where a conversation form support is executed between the request sending apparatus 200 and the staff terminal 300, the management storage portion 150 accumulates conversation data indicating a conversation pattern communicated for the support corresponding to the apparatus name of the request sending apparatus 200, the content of the error, and the support execution date.

Figure 10:
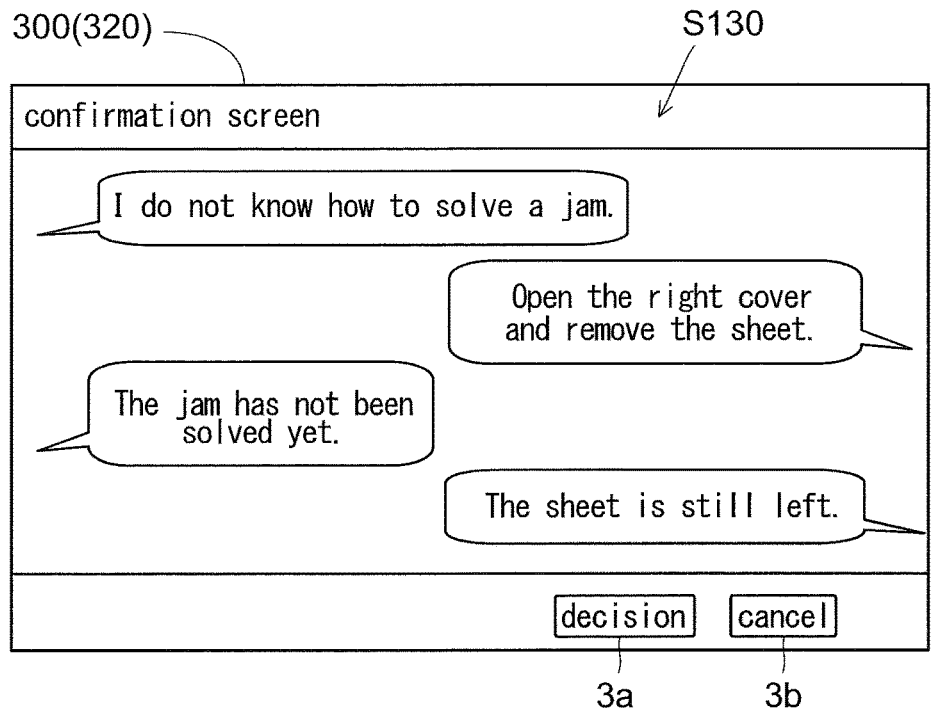
FIG. 10 is a view showing an example of a confirmation screen (selected conversation pattern) displayed on a staff terminal included in a remote support system according to an embodiment of the present disclosure.

When an operation is performed to select a conversation pattern from the list 2a of the selection screen S120, the staff terminal 300 displays a confirmation screen S130 shown in FIG. 10. As an example, it is assumed that the uppermost conversation pattern of the list 2a is selected on the selection screen S120. It is possible to confirm all conversation patterns selected on the selection screen S120 by mean of the confirmation screen S130. Besides, the confirmation screen S130 disposes a decision icon 3a and a cancel icon 3b.

When an operation on the cancel icon 3b is performed on the confirmation screen S130, the staff terminal 300 returns the display screen from the confirmation screen S130 to the selection screen S120. And, the staff terminal 300 accepts again a conversation pattern selection on the selection screen S120. On the other hand, when an operation on the decision icon 3a is performed on the confirmation screen S130, the staff terminal 300 transmits a selection notification to the management server 100. In the meantime, the selection notification includes data that indicate the conversation pattern selected on the selection screen S120. Hereinafter, there is a case where a conversation pattern selected on the staff terminal 300 is called a selected conversation pattern.

Figure 11:
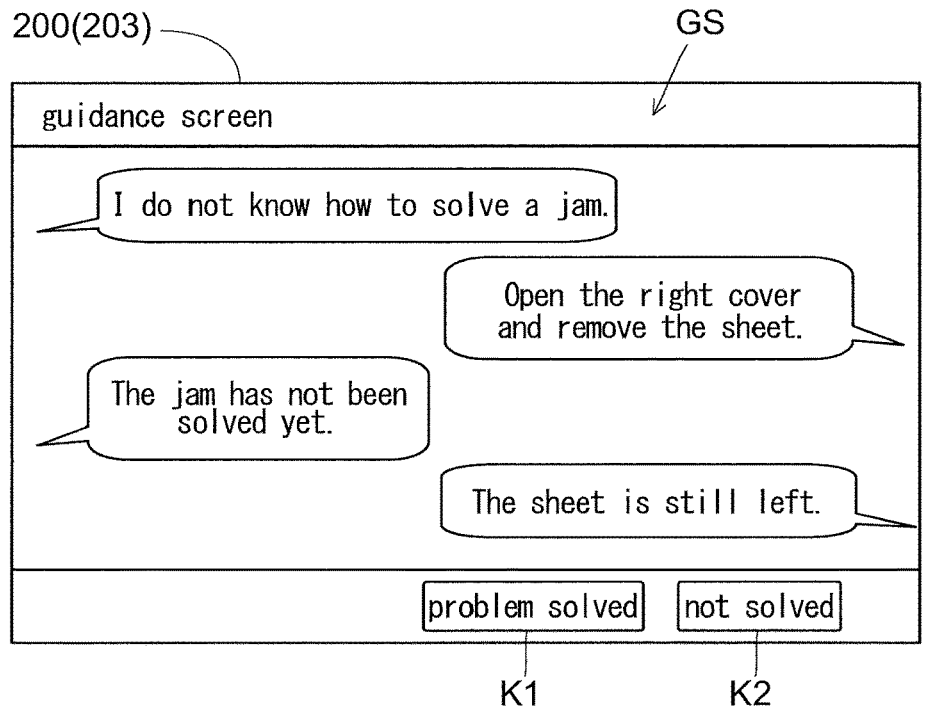
FIG. 11 is a view showing an example of a guidance screen (selected conversation pattern) displayed on a multi-function machine included in a remote support system according to an embodiment of the present disclosure.

When the management communication portion 140 receives the data that indicate the selected conversation pattern, the management server 100 instructs the management communication portion 140 to transmit guidance data, which are for displaying the selected conversation pattern (conversation pattern selected on the staff terminal 300) as a guidance, to the request sending apparatus 200. And, upon receiving the guidance data, as shown in FIG. 11, the request sending apparatus 200 (operation panel 203) displays a guidance screen GS that shows the selected conversation pattern (conversation pattern selected on the staff terminal 300).

In this way, even if it is impossible to perform communication in the conversation form with the user of the request sending apparatus 200, the service staff can provide a suitable guidance for the user of the request sending apparatus 200. Besides, even if it is impossible to perform communication in the conversation form with the service staff, the user of the request sending apparatus 200 is provided with the suitable guidance; accordingly, the user of the request sending apparatus 200 can proceed with the work for solving an error based on the guidance.

In the meantime, when providing the guidance screen GS for the request sending apparatus 200, a particular text such as personal information and the like may be removed from the guidance screen GS. For example, the management server 100 accepts beforehand registration of a text not to be displayed from the user of each of the multi-function machines 200. The registered text is stored into the management storage portion 150. And, the management server 100 compares the selected conversation pattern and the registered text with each other, and if there is a particular text in the selected conversation pattern that matches the registered text, the particular text is removed from the selected conversation pattern when the management server 100 forces the request sending apparatus 200 to display the selected conversation pattern.

Besides, the guidance screen GS displayed on the request sending apparatus 200 (operation panel 203) disposes a problem solution key K1 and a non-solution key K2. And, the user of the request sending apparatus 200 operates the problem solution key K1 or the non-solution key K2 and thereby notifies the service staff whether the error is solved or not by means of the provided guidance. In the meantime, in a case where the error is solved, an operation on the problem solution key K1 is performed, and in a case where the error is not solved, an operation on the non-solution key K2 is performed. In the meantime, also the conversation screen CS (CS1) displayed on the request sending apparatus 200 (operation panel 203) disposes a key K11 corresponding to the problem solution key K1 and a key K12 corresponding to the non-solution key K2.

The management server 100 receives the notification that indicates whether the error is solved or not. And, in the case where the error is not solved (case where an error non-solution notification is received from the request sending apparatus 200), the management server 100 forces the staff terminal 300 to display again the apparatus information screen S110. In other words, the staff terminal 300 accepts again, from the service staff, a selection indicating whether to or not to perform a conversation form support with the request sending apparatus 200. And, upon receiving a notification indicating that a conversation form support is to be performed with the request sending apparatus 200, the management server 100 forces the staff terminal 300 to display again the selection screen S120. At this time, the management server 100 sets a conversation pattern other than the previous selected conversation pattern as a choice.

On the other hand, in the case where the error is solved (case where information indicating an error solution notification is received from the request sending apparatus 200), the management server 100 transmits the information to the staff terminal 300 and ends the support process.

<Selection of Recommended Conversation Pattern>

Figure 9:
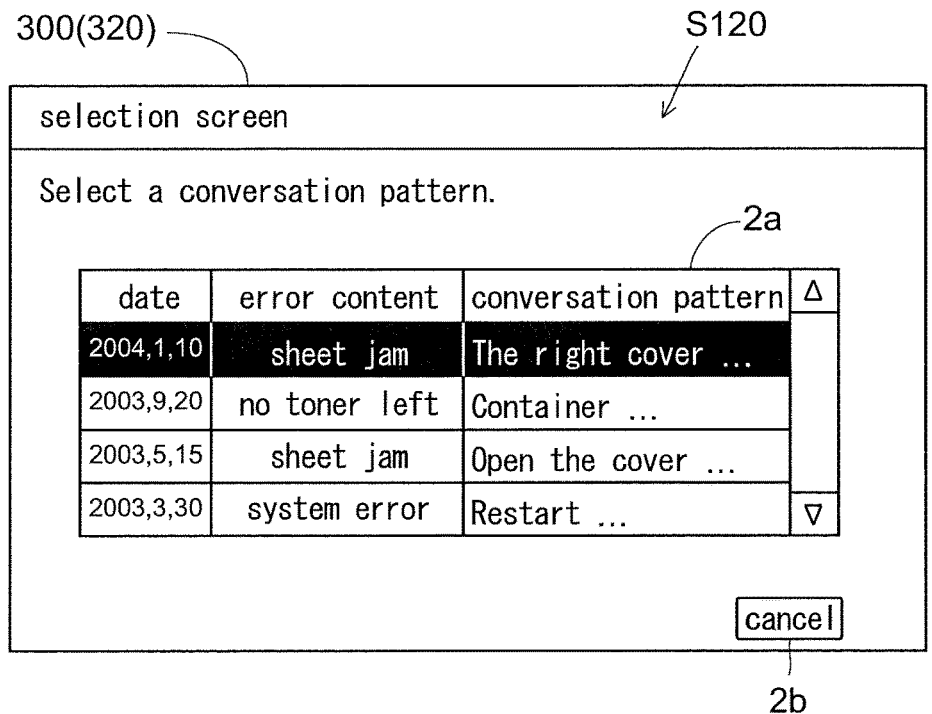
FIG. 9 is a view showing an example of a selection screen displayed on a staff terminal included in a remote support system according to an embodiment of the present disclosure.

As shown in FIG. 9, the selection screen S120 disposes the list 2a that shows the conversation patterns in the conversation form supports, which were performed in times past between the request sending apparatus 200 and the staff terminal 300, as the choices. However, if the list 2a of the selection screen S120 lists many choices (conversation patterns), there is a case where it takes a long time to select a suitable conversation pattern as a guidance from the list 2a.

Figure 12:
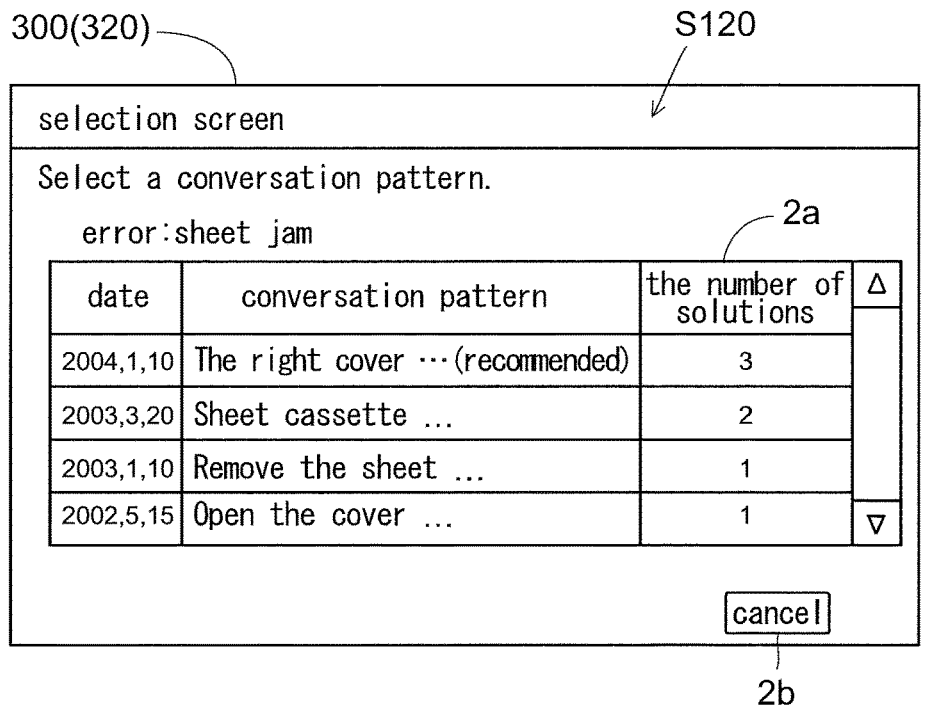
FIG. 12 is a view (view of a selection screen that disposes recommended information) showing an example of a selection screen displayed on a staff terminal included in a remote support system according to an embodiment of the present disclosure.

Because of this, when the management communication portion 140 receives a guidance request, the management control portion 110 extracts conversation patterns in the past supports which were performed when errors identical to the error indicated by the guidance request occurred in the request sending apparatus 200. And, as shown in FIG. 12, the management control portion 110 forces the staff terminal 300 to display the selection screen S120 that shows only the extracted conversation patterns as choices. As an example, if the error occurring in the request sending apparatus 200 is a sheet jam, a conversation pattern in a support performed in times past to solve a sheet jam is extracted, and only the extracted conversation pattern is listed as a choice in the list 2a of the selection screen S120.

Here, based on an error solution notification from the request sending apparatus 200, the management control portion 110 forces the management storage portion 150 to store the number of cases (number of solved errors) where errors are solved. And, when forcing the staff terminal 300 to display the selection screen S120, the management control portion 110 forces the selection screen S120 to dispose information that recommends a conversation pattern that has the largest number of solved errors. In the meantime, of the conversation patterns extracted by the management control portion 110, the conversation pattern in the latest support may be set as the recommended conversation pattern.

For example, when displaying the selection screen S120, the staff terminal 300 disposes a choice, which indicates a recommended conversation pattern, on the uppermost box of the list 2a. Besides, a text (e.g., "recommendation") indicating a recommendation may be disposed in the box corresponding to the recommended conversation pattern. Or, a display form (display color, display size, background color in the box or the like) of the choice indicating the recommended conversation pattern may be changed. Besides, the list 2a of the selection screen S120 may be provided with a box that indicates the number of solved errors corresponding to every conversation pattern.

In the meantime, there is a case where even if a recommended conversation pattern is provided as a guidance, an error is not solved. In other words, there is a case where an error non-solution notification is received from the request sending apparatus 200. In this case, the management control portion 110 extracts conversation patterns, except for the previous recommended conversation pattern, from the conversation patterns in the past supports which were performed when errors identical to the error indicated by the guidance request occurred in the request sending apparatus 200. And, the management control portion 110 sets a conversation pattern, which is one of the extracted conversation patterns and has the second largest number of solved errors next to the previous recommended conversation pattern, as a new recommended conversation pattern. Or, the management control portion 110 sets the conversation pattern in the latest support, which is one of the extracted conversation patterns (except for the previous recommended conversation pattern), as the recommended conversation pattern.

<Flow of Remote Support>

Hereinafter, with reference to a flow chart shown in FIG. 13, a control flow when performing a remote support is described. In the meantime, the flow chart shown in FIG. 13 starts when the management server 100 receives a guidance request, that is, when a touch operation on the help key HK is performed on the operation panel 203 of the multifunction machine 200 (request sending apparatus 200).

In a step S1, the management control portion 110 forces the staff terminal 300 to display the apparatus information screen S110 that shows the various kinds of information (apparatus name, error content, support history and the like) relevant to the request sending apparatus 200. In this way, the staff terminal 300 accepts a selection to or not to perform a conversation form support.

Next, in a step S2, the management control portion 110 determines whether information indicating that a conversation form support is to be performed is transmitted from the staff terminal 300 or not. As a result of this, if it is found out that the information indicating that a conversation form support is to be performed is transmitted from the staff terminal 300, the flow goes to a step S3.

Going to the step S3, the management control portion 110 instructs the request sending apparatus 200 to display the conversation screen CS (CS1). Besides, the management control portion 200 instructs the staff terminal 300 to display the conversation screen CS (CS2). In this way, conversation form communication is performed between the request sending apparatus 200 (its user) and the staff terminal 300 (service staff). And, the management control portion 110 performs determination in a step S8.

Besides, in the step S2, if the information indicating that a conversation form support is to be performed is not transmitted from the staff terminal 300 (if information indicating that a conversation form support is not to be performed is transmitted from the staff terminal 300), the flow goes to a step S4. Going to the step S4, the management control portion 110 generates selection screen data for displaying the selection screen S120.

Specifically, the management control portion 110 extracts conversation patterns in the past supports which were performed when errors identical to errors indicated by the guidance request occurred in the request sending apparatus 200. Besides, the management control portion 110 identifies a conversation pattern, which has the largest number of solved errors, from the extracted conversation patterns. And, the management control portion 110 forces the staff terminal 300 to display the selection screen S120 that disposes information which recommends the conversation pattern having the largest number of solved errors. In other words, the management control portion 110 instructs the management communication portion 140 to transmit the selection screen data for displaying the selection screen S120 to the staff terminal 300. In the meantime, a conversation pattern in the latest support, which is one of the conversation patterns extracted by the management control portion 110, may be used as the recommended conversation pattern.

Then, in a step S5, the management control portion 110 determines presence of a selection notification from the staff terminal 300. In other words, the management control portion 110 determines whether data indicating a conversation pattern (selected conversation pattern) selected on the selection screen S120 are received or not. For example, if there is not a response from the staff terminal 300 even if a predetermined period (several seconds to several dozens of seconds) elapses after the selection screen data for displaying the selection screen S120 are transmitted to the staff terminal 300, the management control portion 110 determines that a selection notification is not transmitted from the staff terminal 300. And, if there is not a selection notification from the staff terminal 300, the flow goes to a step S6.

Going to the step S6, the management control portion 110 extracts the conversation patterns in the past supports which were performed when errors identical to the error indicated by the guidance request occurred in the request sending apparatus 200, and automatically selects the conversation pattern, which has the largest number of solved errors, from the extracted conversation patterns. In the meantime, the conversation pattern in the latest support, which is one of the conversation patterns extracted by the management control portion 110, may be automatically selected as the selected conversation pattern. Thereafter, the flow goes to a step S7. Besides, in a case as well where there is a selection notification from the staff terminal 300 in the step S5, the flow goes to the step S7.

Going to the step S7, the management control portion 110 instructs the management communication portion 140 to transmit guidance data, which are for displaying the selected conversation pattern selected on the selection screen S120 or the selected conversation pattern automatically selected on the management server as the guidance, to the request sending apparatus 200. In other words, the management control portion 110 forces the request sending apparatus 200 to display the guidance screen GS that shows the selected conversation pattern.

Thereafter, in a step S8, the management control portion 110 determines whether the error occurring in the request sending apparatus 200 is solved or not. In other words, the management control portion 110 determines whether the management communication portion 140 receives an error solution notification from the request sending apparatus 200 or not. As a result of this, if it is found out that the error is not solved, the flow goes to the step S1, while if it is found out that the error is solved, the flow goes to a step S9.

Going to the step S9, the management control portion 110 updates the support history information. Specifically, in the case where the conversation form support is performed and thereby the error is solved, the management storage portion 150 stores conversation data that indicate the conversation pattern communicated for the support corresponding to the apparatus name, error content and support execution date of the request sending apparatus 200. Besides, in the case where the support is performed by means of the guidance screen GS and thereby the error is solved, the number of solved errors is increased correspondingly to the conversation pattern provided for the support.

As described above, in the remote support system RS according to the present embodiment, the multi-function machine 200 (image forming apparatus), the staff terminal 300 used by the service staff who supports the use of the multi-function machine 200, and the management server 100 (management apparatus) are connected to one another for communication. The management server 100 includes: the management storage portion 150 (storage portion) that stores support history information indicating a history of a support which is performed for the multi-function machine 200 when an error occurs in the multi-function machine 200; the management communication portion 140 (communication portion) that communicates with the multi-function machine 200 and the staff terminal 300, and receives, from the multi-function machine 200, a guidance request for requesting a guidance necessary for solving the error occurring in the multi-function machine 200; and the management control portion 110 (control portion) that performs the control of the management server 100. Here, the management storage portion 150 accumulates a conversation pattern, which is communicated in the conversation form between the multi-function machine 200 and the staff terminal 300 to solve the error occurring in the multi-function machine 200, as a history of the support performed for the multi-function machine 200. And, when the management communication portion 140 receives the guidance request, the management control portion 110 forces the staff terminal 300 to display the selection screen S120 that displays, as choices, the conversation patterns in the conversation form supports, which were performed in times past between the request sending apparatus 200, namely, the multi-function machine 200 transmitting the guidance request, and the staff terminal 300. Besides, when data, which indicate a conversation pattern selected at the staff terminal 300, are transmitted from the staff terminal 300 and the management communication portion 140 receives the data, the management control portion 110 instructs the management communication portion 140 to transmit guidance data, which are for displaying a selected conversation pattern, namely, the conversation pattern selected at the staff terminal 300 as a guidance, to the request sending apparatus 200, thereby forcing the request sending apparatus 200 to display the selected conversation pattern as the guidance.

In the remote support system RS according to the present embodiment, when the management server 100 (management communication portion 140) receives the guidance request from the multi-function machine 200, the staff terminal 300 displays the selection screen S120 that displays, as the choices, the conversation form patterns in the conversation form supports which were performed in times past between the request sending apparatus 200 and the staff terminal 300. And, when a conversation pattern is selected on the selection screen S120, the selected conversation pattern is displayed as the guidance on the request sending apparatus 200. In this way, when a support is being performed for one (hereinafter, called a first apparatus for the sake of convenience) of the multi-function machines 200, even if a guidance request is accepted from another (hereinafter, called a second apparatus for the sake of convenience) of the multi-function machines 200, it is possible to perform a support equivalent to a conversation form support for the second apparatus by only selecting a conversation pattern suitable for solving an error occurring in the second apparatus. In other words, even in a case where supports from a plurality of the multi-function machines 200 are requested during an overlapping period, it is possible to quickly perform a support for each apparatus. In the meantime, the user of the second apparatus can enjoy a support equivalent to a conversation form support without waiting for an end of the support performed by the service staff for the first apparatus, which is convenient.

Further, in the support system RS, the conversation form pattern, which is communicated between the multi-function machine 200 and the staff terminal 300 to solve the error occurring in the multi-function machine 200, is accumulated in the management server 100 (management storage portion 150) as a history of the support performed for the multi-function machine 200. And, the request sending apparatus 200 displays the conversation pattern (conversation pattern accumulated in the management server 100) selected by the service staff as the guidance. In this way, it becomes unnecessary to prepare beforehand a guidance corresponding to an error likely to occur in the multi-function machine 200.

Besides, in the present embodiment, as described above, the guidance request includes the error information that indicates the content of the error occurring in the request sending apparatus 200. And, when the management communication portion 140 receives the guidance request, the management control portion 110 extracts conversation patterns in the conversation form supports which were performed when errors identical to the error indicated by the guidance request occurred in the request sending apparatus 200, and forces the staff terminal 300 to display the selection screen S120 that shows the extracted conversation patterns as choices. In this way, when a suitable conversation pattern is selected on the selection screen S120, the number of choices decreases (an unsuitable conversation pattern is not used as a choice); accordingly, it becomes easy for the service staff to perform the work for selecting a conversation pattern.

Besides, in the present embodiment, as described above, when an error is solved at the request sending apparatus 200, the management communication portion 140 receives an error solution notification transmitted from the request sending apparatus 200. Besides, based on the error solution notification from the request sending apparatus 200, the management control portion 110 forces the management storage portion 150 to store the number of solved errors that is the number of cases where errors are solved. And, when forcing the staff terminal 300 to display the selection screen S120, the management control portion 110 forces the selection screen S120 to dispose therein information indicating that a conversation pattern having the largest number of solved errors is recommended. In this way, it is possible to easily select a conversation pattern suitable for solving an error occurring in the request sending apparatus 200.

Besides, in the present embodiment, as described above, when the error occurring in the request sending apparatus 200 is not solved, the management communication portion 140 receives an error non-solution notification transmitted from the request sending apparatus 200. Besides, in a case where the management communication portion 140 receives the error non-solution notification after the management control portion 110 forces the request sending apparatus 200 to display a selected conversation pattern as a guidance, the management control portion 110 forces the staff terminal 300 to display again the selection screen S120. And, when forcing the staff terminal 300 to display again the selection screen S120, the management control portion 110 sets a conversation pattern other than the previous selected conversation pattern as a choice. In this way, it is possible to alleviate the guidance (conversation pattern), which does not lead to the error solution, being displayed repeatedly on the request sending apparatus 200.

Besides, in the present embodiment, as described above, when there is not a response from the staff terminal 300 even if a predetermined period elapses after the screen data for forcing the staff terminal 300 to display the selection screen S120 are transmitted to the staff terminal 300, the management control portion 110 extracts the conversation patterns in the conversation form supports which were performed when errors identical to the error indicated by the guidance request occurred in the request sending apparatus 200, and automatically selects the conversation pattern, which has the largest number of solved errors, from the extracted conversation patterns as the selected conversation pattern. In this way, even if the work of selecting a conversation pattern is not performed by the service staff, it is possible to force the request sending apparatus 200 to display a suitable conversation pattern as a guidance.

Besides, in the present embodiment, as described above, upon receiving a guidance request, the management communication portion 140 transmits a selection request for selecting to or not to perform a conversation form support with the request sending apparatus 200. And, in the case where the management communication portion 140 receives, from the staff terminal 300, a notification indicating that a conversation form support is to be performed, the management control portion 110 instructs the request sending apparatus 200 and the staff terminal 300 to display the conversation screen CS for performing the conversation form support, and in the case where the management communication portion 140 receives, from the staff terminal 300, a notification indicating that a conversation form support is not to performed, the management control portion 110 forces the staff terminal 300 to display the selection screen S120. In this way, if the service staff has enough time, it is possible to perform a conversation form support as well for the request sending apparatus 200.

Besides, in the present embodiment, as described above, the management storage portion 150 stores a text that is preregistered and not to be displayed. And, if there is a particular text in a selected conversation pattern that matches the registered text, when forcing the request sending apparatus 200 to display the selected conversation pattern, the management control portion 110 removes the particular text. In this way, it is possible to alleviate personal information and the like leaking from the request sending apparatus 200.

It should be considered that the embodiment disclosed this time is an example in all respects and is not limiting. The scope of the present disclosure is not indicated by the above description of the embodiment but by the claims, further, all modifications within the scope of the claims and the meaning equivalent to the claims are covered.

What is claimed is:
1. A remote support system in which an image forming apparatus, a staff terminal used by service staff who supports use of the image forming apparatus, and a management apparatus are connected to one another for communication, wherein the management apparatus includes:
a storage portion that stores support history information indicating a history of a support which is performed for the image forming apparatus when an error occurs in the image forming apparatus,
a communication portion that communicates with the image forming apparatus and the staff terminal, and receives, from the image forming apparatus, a guidance request for requesting a guidance necessary for solution of the error occurring in the image forming apparatus, and
a control portion that performs control of the management apparatus;
the storage portion accumulates a conversation pattern, which is communicated in a conversation form between the image forming apparatus and the staff terminal to solve the error occurring in the image forming apparatus, as the history of the support performed for the image forming apparatus;
when the communication portion receives the guidance request, the control portion forces the staff terminal to display a selection screen that displays, as choices, the accumulated conversation patterns in conversation form supports, which were performed in times past between the image forming apparatus and the staff terminal, and
when selection notification, which indicates the conversation pattern selected on the selection screen, is transmitted from the staff terminal and the communication portion receives the selection notification, the control portion instructs the communication portion to transmit guidance data, which are used to display a selected conversation pattern, namely, the conversation pattern selected at the staff terminal as the guidance, to the image forming apparatus, thereby forcing the image forming apparatus to display the selected conversation pattern as the guidance;
the communication portion receives an error non-solution notification that is transmitted from the image forming apparatus when the error occurring in the image forming apparatus is not solved;
in a case where the communication portion receives the error non-solution notification after the control portion forces the image forming apparatus to display the selected conversation pattern as the guidance, the control portion forces the staff terminal to display the selection screen again; and
when the control portion forces the staff terminal to display the selection screen again, the control portion sets, out of conversation patterns other than the previous selected conversation pattern, the conversation pattern in the latest support as a choice.

2. The remote support system according to claim 1, wherein
the guidance request includes error information that indicates content of the error occurring in the image forming apparatus, and
when the communication portion receives the guidance request, the control portion extracts the conversation pattern in conversation form support that is performed when an error identical to the error indicated by the guidance request occurs in the image forming apparatus, and forces the staff terminal to display the selection screen which shows the extracted conversation pattern as a choice.

3. The remote support system according to claim 2, wherein
the communication portion receives an error solution notification that is transmitted from the image forming apparatus when the error is solved at the image forming apparatus,
based on the error solution notification from the image forming apparatus, the control portion forces the storage portion to store an error solution number that is a number of cases where errors are solved for every one of the conversation patterns, and
when forcing the staff terminal to display the selection screen, the control portion forces the selection screen to dispose information which recommends the conversation pattern having a largest number of solved errors.

4. The remote support system according to claim 1, wherein
the guidance request includes error information that indicates content of the error occurring in the image forming apparatus,
the communication portion receives an error solution notification that is transmitted from the image forming apparatus when the error is solved at the image forming apparatus,
based on the error solution notification from the image forming apparatus, the control portion forces the storage portion to store an error solution number that is a number of cases where errors are solved for every one of the conversation patterns, and
when there is not a response from the staff terminal even if a predetermined period elapses after screen data for forcing the staff terminal to display the selection screen are transmitted to the staff terminal, the control portion extracts the conversation patterns in a conversation form support that is performed when an error identical to the error indicated by the guidance request occurs in the image forming apparatus, and lists on the selection screen the extracted conversation patterns in order of decreasing numbers of solved errors, while listing conversation patterns with equal numbers of solved errors in order of date.

5. The remote support system according to claim 1, wherein
when the communication portion receives the guidance request, the communication portion transmits a selection request, which is for selecting to or not to perform a conversation form support with the image forming apparatus, to the staff terminal, and
in a case where the communication portion receives, from the staff terminal, a notification indicating that a conversation form support is to be performed, the control portion instructs the image forming apparatus and the staff terminal to display a conversation screen for performing the conversation form support, and in a case where the communication portion receives, from the staff terminal, a notification indicating that a conversation form support is not to be performed, the control portion forces the staff terminal to display the selection screen.

6. The remote support system according to claim 1, wherein
the storage portion stores a text that is preregistered and not to be displayed, and if there is a particular text in the selected conversation pattern that matches the preregistered text, the control portion removes the predetermined text from the selected conversation pattern when forcing the image forming apparatus to display the selected conversation pattern.

7. A method for controlling a remote support system in which an image forming apparatus, a staff terminal used by service staff who supports use of the image forming apparatus, and a management apparatus are connected to one another for communication, wherein the management apparatus accumulates a conversation pattern, which is communicated in a conversation form between the image forming apparatus and the staff terminal to solve an error occurring in the image forming apparatus, as the history of the support performed for the image forming apparatus;

the method comprising:

a step in which when the management apparatus receives, from the image forming apparatus, a guidance request for requesting a guidance necessary for solution of the error occurring in the image forming apparatus, the staff terminal is forced to display a selection screen that displays, as choices, the conversation patterns in conversation form supports, which were performed in times past between the image forming apparatus and the staff terminal, and a step in which when a selection notification, which indicate the conversation pattern selected on the selection screen, is transmitted from the staff terminal and the management apparatus receives the selection notification, guidance data, which are used to display a selected conversation pattern, namely, the conversation pattern selected at the staff terminal as the guidance, are transmitted from the management apparatus to the image forming apparatus, so that the image forming apparatus is forced to display the selected conversation pattern as the guidance;

the management apparatus receives an error non-solution notification that is transmitted from the image forming apparatus when the error occurring in the image forming apparatus is not solved, on receiving the error non-solution notification after forcing the image forming apparatus to display the selected conversation pattern as the guidance, the management apparatus forces the staff terminal to display the selection screen again, and when forcing the staff terminal to display the selection screen again, the management apparatus sets, out of conversation patterns other than the previous selected conversation pattern, the conversation pattern in the latest support as a choice.

* * * * *